United States Patent
Zhang et al.

(10) Patent No.: US 11,774,548 B2
(45) Date of Patent: Oct. 3, 2023

(54) LINEAR PREDICTION-BASED BISTATIC DETECTOR FOR AUTOMOTIVE RADAR

(71) Applicant: Aptiv Technologies Limited, St. Michael (BB)

(72) Inventors: Xin Zhang, Agoura Hills, CA (US); Zhengzheng Li, Agoura Hills, CA (US); Yu Zhang, Thousand Oaks, CA (US)

(73) Assignee: Aptiv Technologies Limited, St. Michael (BB)

( * ) Notice: Subject to any disclaimer, the term of this patent is extended or adjusted under 35 U.S.C. 154(b) by 318 days.

(21) Appl. No.: 17/242,175

(22) Filed: Apr. 27, 2021

(65) Prior Publication Data
US 2022/0260672 A1 Aug. 18, 2022

Related U.S. Application Data

(60) Provisional application No. 63/148,978, filed on Feb. 12, 2021.

(51) Int. Cl.
*G01S 7/02* (2006.01)
*G01S 13/58* (2006.01)
*G01S 13/931* (2020.01)

(52) U.S. Cl.
CPC ............ *G01S 7/021* (2013.01); *G01S 13/588* (2013.01); *G01S 13/931* (2013.01)

(58) Field of Classification Search
CPC ........ G01S 7/403; G01S 7/021; G01S 13/588; G01S 13/931

USPC ............................. 342/105, 27, 195, 149, 87
See application file for complete search history.

(56) References Cited

U.S. PATENT DOCUMENTS

| 10,809,737 B2 | 10/2020 | Li et al. | |
| 2020/0363522 A1* | 11/2020 | Ishikawa | G01S 7/403 |
| 2021/0011122 A1* | 1/2021 | Tanaka | G01S 17/42 |

OTHER PUBLICATIONS

Chan, et al., "A parameter estimation approach to estimation of frequencies of sinusoids", Apr. 1981, pp. 214-219, 6 pages.
(Continued)

*Primary Examiner* — Bo Fan
(74) *Attorney, Agent, or Firm* — Sawtooth Patent Group PLLC

(57) ABSTRACT

The disclosure provides systems, apparatuses, and techniques for operating automotive MIMO radars in crowded multi-path environments to obtain reliable detections by linearly predicting whether a bistatic condition occurred. To avoid saturating computing resources processing bistatic detections, the described techniques enable a radar system to quickly identify and discard from the field-of-view radar detections that are likely a result of bistatic conditions. By ignoring unusable radar returns that are likely a result of bistatic conditions, an example radar system can focus on processing radar returns from static conditions, for example, in providing radar-based detections as output to an automotive system that is driving a vehicle in an autonomous or a semi-autonomous mode. In so doing, the example radar system provides a highly accurate static object detector that is sufficiently quick in detecting bistatic conditions for use in vehicle-safety systems as well as autonomous and semi-autonomous control.

19 Claims, 7 Drawing Sheets

(56) References Cited

OTHER PUBLICATIONS

Qian, et al., "Enhanced PUMA for direction-of-arrival estimation and its performance analysis", Aug. 15, 2016, pp. 4127-4137, 11 pages.
Chen, et al., "A new method for joint DOD and DOA estimation in bistatic MIMO radar", Feb. 2010, pp. 714-718.
Engels, et al., "Automotive MIMO Radar Angle Estimation in the Presence of Multipath", Oct. 2017, 5 pages.
Haardt, et al., "Unitary ESPRIT: How to Obtain Increased Estimation Accuracy with a Reduced Computational Burden", May 1995, 1232-1242.
Jiang, et al., "Joint DOD and DOA Estimation for Bistatic MIMO Radar in Unknown Correlated Noise", Nov. 2015, 5113-5125.
Jin, "Joint DOD and DOA estimation for bistatic MIMO radar", Feb. 2009, pp. 244-251.
McGlaning, "Multipath Propagation", Wireless Receiver Design for Digital Communications—Chapter 3., Jan. 2012, pp. 190-206.
Roy, et al., "ESPRIT—Estimation of Signal Parameters Via Rotational Invariance Techniques", Jul. 1989, pp. 984-995.
Scheiner, et al., "Seeing Around Street Corners: Non-Line-of-Sight Detection and Tracking In-the-Wild Using Doppler Radar", Dec. 2019, pp. 2068-2077.
Sun, et al., "MIMO Radar for Advanced Driver-Assistance Systems and Autonomous Driving: Advantages and challenges", Jul. 2020, pp. 98-117.
Visentin, et al., "Analysis of Multipath and DOA Detection Using a Fully Polarimetric Automotive Radar", Apr. 2018, 8 pages.
"Extended European Search Report", EP Application No. 21212706. 2, dated May 25, 2022, 13 pages.
Fischer, et al., "Adaptive Super-Resolution with a Synthetic Aperture Antenna", Oct. 31, 2012, pp. 250-253.

* cited by examiner

LINEAR PREDICTION-BASED BISTATIC DETECTOR FOR AUTOMOTIVE RADAR

CROSS-REFERENCE TO RELATED APPLICATION

This application claims the benefit under 35 U.S.C. 119(e) of U.S. Provisional Application No. 63/148,978, filed Feb. 12, 2021, the disclosure of which is hereby incorporated by reference in its entirety herein.

BACKGROUND

Many vehicles use radar systems to detect static objects. When driving down a road, such systems may encounter relatively crowded environments where many erroneous radar returns may be detected, including so-called "multi-path detections." Multi-path detections are radar returns that encounter more than one object on a return path to a detector, for example, when the environment includes a surface that is highly reflective of radar energy, such as a wall, a guardrail, or a moving truck. These multi-path detections can appear within radar data similar to static detections; if relied on for autonomous or semi-autonomous control, these false detections may cause unsafe or erratic driving behavior, requiring human intervention.

SUMMARY

This document describes techniques and systems related to a linear prediction-based bistatic detector for automotive radar. In some examples, a radar system for installation on a vehicle includes at least one processor. The at least one processor is configured to obtain radar returns reflected off one or more objects in an environment of the vehicle and determine, based on the radar returns, a linear prediction as to whether a bistatic condition exists with the one or more objects in the environment. The at least one processor is further configured to, responsive to determining that the linear prediction indicates a bistatic condition does not exist with the one or more objects in the environment, refrain from discarding the radar returns. Further responsive to determining that the linear prediction indicates a bistatic condition does not exist with the one or more objects in the environment, the at least one processor is configured to output a range and range rate associated with the one or more objects for localizing the vehicle in the environment relative to the one or more objects.

This document also describes methods performed by the above-summarized techniques and components and other configurations of the radar system set forth herein, as well as means for performing these methods.

This Summary introduces simplified concepts related to a linear prediction-based bistatic detector for automotive radar, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of a linear prediction-based bistatic detector for automotive radar are described in this document with reference to the following figures. The same numbers are often used throughout the drawings to reference like features and components:

FIG. 1-2 illustrates different detection conditions encountered by a vehicle with a radar system that uses linear prediction-based bistatic detections, in accordance with techniques of this disclosure;

FIG. 1-3 illustrates a fast Fourier transform (FFT) spectrum of an invalid synthetic array formed under bistatic conditions;

FIG. 2 illustrates an example configuration of a vehicle with a radar system that uses linear prediction-based bistatic detections;

FIGS. 3-1 and 3-2 illustrate example conceptual diagrams of a portion of a synthetic array accessed by a radar system that uses linear prediction-based bistatic detections.

DETAILED DESCRIPTION

Overview

Figure 1:
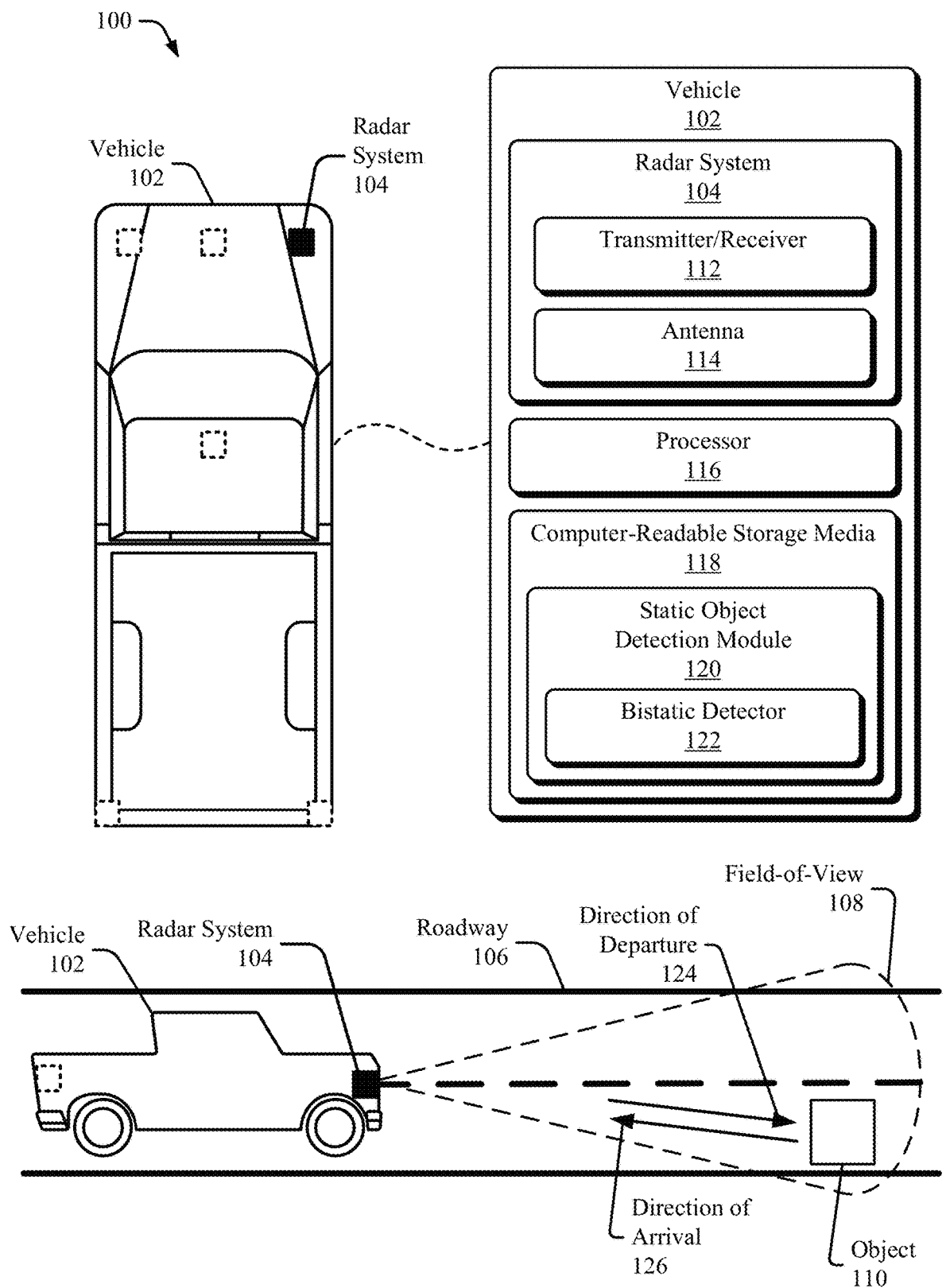
FIG. 1-1 illustrates an example environment in which a radar system can use linear prediction-based bistatic detections, in accordance with techniques of this disclosure.

The disclosure provides systems, apparatuses, and techniques for operating automotive multiple-input and multiple-output (MIMO) radars in crowded multi-path environments to obtain reliable detections by linearly predicting whether a bistatic condition occurred. In radar, a bistatic condition occurs when a reflection takes multiple trajectories or paths to travel from an object to a receiver. For example, ideal radar reflections travel on a direct path between the reflecting object and the receiver; a direct path is the shortest distance between them. Two-way multi-path reflections are also possible, in which case, a longest path is taken between the object and the receiver; a radar transmission and a radar reflection each take multiple trajectories to travel between an object and transceiver. Bistatic conditions, on the other hand, represent in-between scenarios where an intermediate-length path is traveled from the object to the receiver.

During these bistatic conditions, radar detections often cannot be used as reliable indicators, for example, to detect static objects in a radar system field-of-view. This is because, in a bistatic condition, a radar reflection has a direction-of-arrival (DOA) that is not equal to a corresponding radar transmission's direction-of-departure (DOD). This mismatch violates a necessary condition in some MIMO radar system for forming a synthetic array. Bistatic conditions mask the position of the reflecting object, which makes determining a radar range and range rate difficult.

MIMO-related techniques are widely used in automotive radar systems. In MIMO, a synthetic uniform linear array (ULA) (also referred to simply as "synthetic array") is usually formed with a larger aperture than a corresponding physical array. For example, eight physical channels of a radar transceiver (e.g., two transmit channels and six receive channels) are configured using MIMO to provide twelve channels or any other quantity greater than a total number of physical channels. With additional channels, a MIMO can operate with an improved angular resolution, relying on a flexible physical layout of inexpensive and possibly fewer hardware components than a traditional non-MIMO radar. However, a synthetic array using MIMO can often only be formed if the DOD is the same as the DOA. In other words, under a bistatic condition, the DOD is not equal to the DOA, which can cause errors in radar detections observed using the MIMO because these radar detections cannot easily be mapped to a corresponding synthetic array, which can lead to a saturation or overconsumption of computing resources in trying to make sense of the radar detections to localize a vehicle. At best, this oversaturation may merely delay a radar system output; at worst, the output includes errors from incorrectly mapping a surrounding environment, which can cause an automotive system or a controller of a vehicle to drive in an unsafe manner.

To avoid saturating computing resources processing bistatic detections, the described techniques enable a radar system to quickly identify and discard from the field-of-view radar detections that are likely a result of bistatic conditions. By ignoring unusable radar returns that are likely a result of bistatic conditions, an example radar system can focus on processing radar returns from static conditions, for example, in providing radar-based detections as output to an automotive system or controller that is driving a vehicle in an autonomous or a semi-autonomous mode. In so doing, the example radar system provides a highly accurate static object detector that is sufficiently quick in detecting bistatic conditions for use in vehicle-safety systems as well as autonomous and semi-autonomous control.

Operating Environment

FIG. 1-1 illustrates an example environment in which a radar system can use linear prediction-based bistatic detections, in accordance with techniques of this disclosure. In the depicted environment 100, the radar system 104 is mounted to, or integrated within, a vehicle 102 traveling on a roadway 106. Within a field-of-view 108, the radar system 104 can detect one or more static objects 110 near the vehicle 102. The radar system emits radar signals with a direction of departure (DOD) 124 and expects to receive corresponding radar reflections with a direction of arrival (DOA) 126 that matches the DOD 124.

Although illustrated as a passenger truck, the vehicle 102 can represent other types of motorized vehicles (e.g., a car, motorcycle, bus, tractor, semi-trailer truck), non-motorized vehicles (e.g., a bicycle), railed vehicles (e.g., a train), watercraft (e.g., a boat), aircraft (e.g., an airplane), or spacecraft (e.g., satellite). In general, manufacturers can mount the radar system 104 to any moving platform, including moving machinery or robotic equipment.

In the depicted implementation, the radar system 104 includes components mounted on the front of the vehicle 102; the radar system 104 radiates the object 110. The radar system 104 can detect the object 110 from any exterior surface of the vehicle 102. For example, components of the radar system 104 can be arranged in a front, back, top, bottom, or side portion of the vehicle 102, within a bumper, integrated into a side mirror, formed as part of a headlight or tail light, or at any other interior or exterior location where the object 110 requires detection. In some cases, the vehicle 102 includes multiple radar systems 104, such as a first radar system 104 and a second radar system 104, that provide a larger instrument field-of-view 108. In general, vehicle manufacturers can design the locations of one or more radar systems 104 to provide a particular field-of-view 108 that encompasses a region of interest. Example fields-of-view 108 include a 360-degree field-of-view, one or more 180-degree fields-of-view, one or more 90-degree fields-of-view, and so forth, which can overlap into the field-of-view 108 of a particular size.

The object 110 includes one or more materials that reflect radar signals. Depending on the application, the object 110 can represent a target of interest from which the vehicle 102 can navigate safely in the roadway 106. For example, the object 110 can be a parked vehicle, a roadside sign, a roadway barrier, or debris on the roadway 106.

The radar system 104 emits electromagnetic (EM) radiation by transmitting EM signals or waveforms via antenna elements. In the environment 100, the radar system 104 can detect and track the object 110 by transmitting and receiving one or more radar signals. For example, the radar system 104 can transmit EM signals between 100 and 400 gigahertz (GHz), between 4 and 100 GHz, or between approximately 70 and 80 GHz.

The radar system 104 is a MIMO radar system and relies on a ULA to match the radar returns to the corresponding signals, although the radar system 104 can operate as a traditional radar system that does not rely on dynamic MIMO techniques. The radar system 104 can include a transmitter/receiver 112 and at least one antenna 114 to transmit EM signals and receive reflected versions of the EM signals. The transmitter/receiver 112 includes one or more components for emitting the EM signals. Also includes in the transmitter/receiver 112 are one or more components for detecting the reflected EM signals. Manufacturers can incorporate the transmitter/receiver 112 on a single integrated circuit (e.g., configured as a transceiver) or on multiple integrated circuits.

The radar system 104 also includes one or more processors 116 (e.g., an energy processing unit) and computer-readable storage media (CRM) 118. The processor 116 can be a microprocessor or a system-on-chip. The processor 116 can execute computer-executable instructions stored in the CRM 118. For example, the processor 116 can process EM energy received by the antenna 114 and determine, using a static object detection module 120 that relies on a bistatic detector 122, a location of the object 110 relative to the radar system 104. The static object detection module 120 can also detect various features (e.g., range, target angle, range rate, velocity) of the object 110.

The processor 116 can also generate radar data that the radar system 104 outputs for at least one automotive system of the vehicle 102. For example, the processor 116 can control, based on processed EM energy from the antenna 114, an autonomous or semi-autonomous driving system of the vehicle 102. An autonomous driving system can control an operation of the vehicle 102 to maneuver around the object 110 or to slow down or come to a stop to avoid a collision with the object 110. As another example, a semi-autonomous driving system can alert an operator of the vehicle 102 that the object 110 is in the roadway 106.

The static object detection module 120 receives radar data, for example, raw or time-series frames associated with EM energy received by the antenna 114, and determines whether a object 110 is in the roadway 106 and various features associated with the object 110. The static object detection module 120 can use the bistatic detector 122 to assist with the described operations and functions, e.g., for linearly predicting bistatic conditions. The radar system 104 can implement the static object detection module 120 and the bistatic detector as computer-executable instructions in the CRM 118, hardware, software, or a combination thereof that is executed by the processor 116. The output of the static object detection module 120 can include an identification of the static objects 110 and one or more features corresponding to the static objects 110 for subsequent classification, which may be considered in performing operations to control the vehicle 102.

Using an input of radar detections including range-time maps, the bistatic detector 122 can perform linear predictions as to the existence of bistatic conditions in the environment 100. An output of the bistatic detector 122 may include a flag indicative of whether a portion of the input is associated with a bistatic condition. The flag may trigger a filtering step that executes as part of the static object detection module 120 and/or the bistatic detector 122 to remove or discard the portions of the input that are predicted to be associated with bistatic conditions.

Consider the environment 100, the vehicle 102 travels on the roadway 106. The radar system 104 detects the object 110. Responsive to a linear prediction performed by the bistatic detector 122, the radar system 104 can also discard the radar returns attributed to the object 110 or track the object 110 and extract features associated with it. As described above, the vehicle 102 can also include at least one automotive system that relies on data from the radar system 104, such as a driver-assistance system, an autonomous-driving system, or a semi-autonomous-driving system. The radar system 104 can include an interface to an automotive system that relies on the data. For example, the processor 116 outputs, via the interface, a signal based on EM energy received by the antenna 114.

Generally, the automotive systems use radar data provided by the radar system 104 to perform a function. For example, the driver-assistance system can provide blind-spot monitoring and generate an alert that indicates a potential collision with the object 110. The radar data can also indicate when it is safe or unsafe to change lanes. The autonomous-driving system may move the vehicle 102 to a particular location on the roadway 106 while avoiding collisions with the object 110. The radar data provided by the radar system 104 can also provide information about a distance to and the location of the object 110 to enable the autonomous-driving system to perform emergency braking, perform a lane change, or adjust the speed of the vehicle 102.

Figures 1, 2:
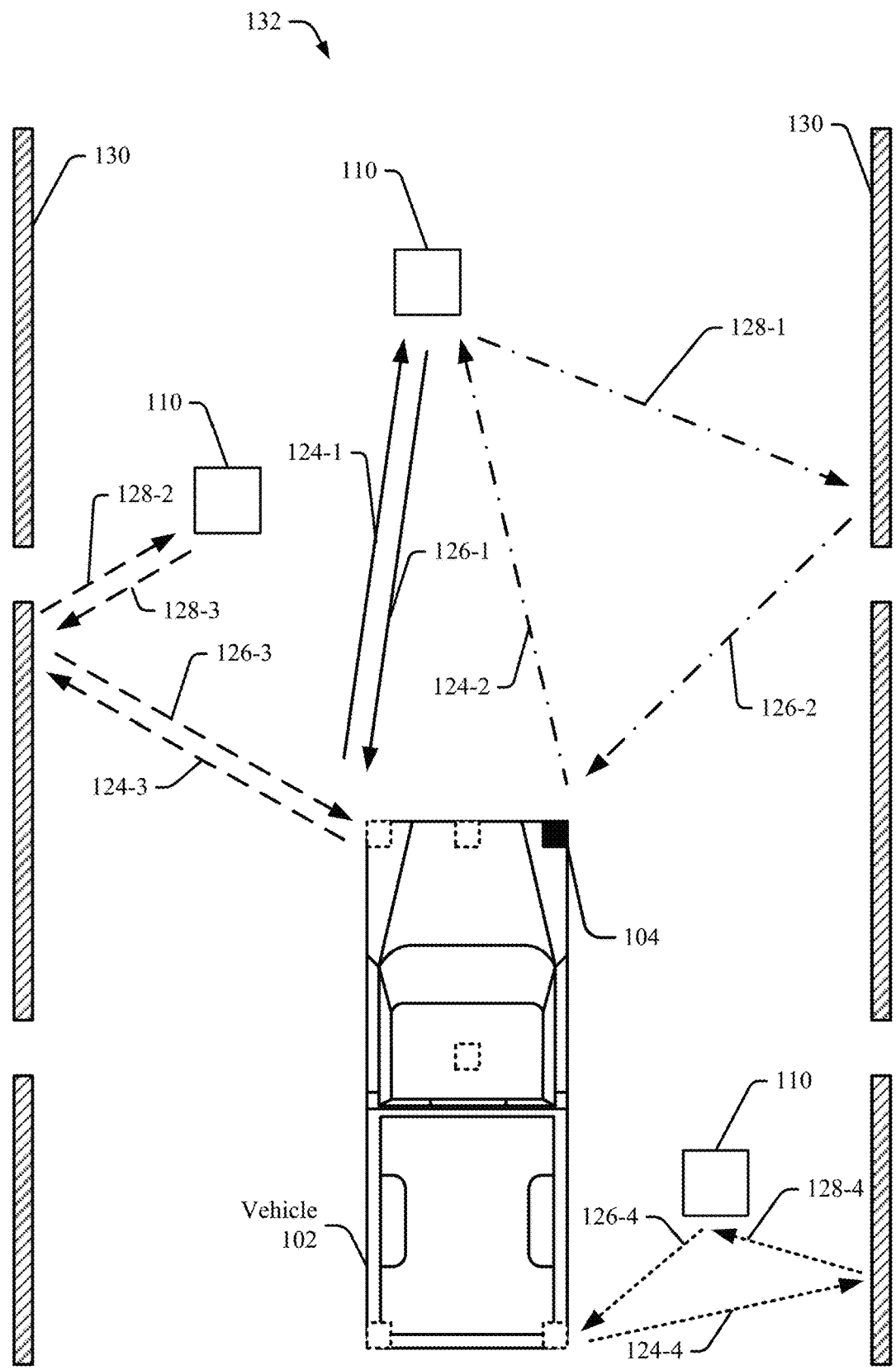

FIG. 1-2 illustrates different detection conditions 132 encountered by a vehicle with a radar system that uses linear prediction-based bistatic detections, in accordance with techniques of this disclosure. The one or more objects 110 are at different positions relative the vehicle 102; on either side of the vehicle 102, a barrier 130 (e.g., a railing, a construction zone boundary) exists. The radar system 104 detects the one or more objects 110 by emitting radiation in a DOD 124-1, a DOD 124-2, a DOD 124-3, or a DOD 124-4, and receiving corresponding radar returns from a DOA 126-1, a DOA 126-2, a DOA 126-3, or a DOA 126-4.

In one of the detection conditions 132, a static condition exists. The static condition is shown in front of the vehicle 102. The emitted radiation is transmitted in the DOD 124-1, and the corresponding radar returns are reflected from the objects 110 in the DOA 126-1. The bistatic detector 122 may determine that the DOA 124-1 and the DOA 126-1 are equal, and therefore, no bistatic condition exists in front of the vehicle 102.

In each of the other conditions 132, a multi-static condition exists. For example, off to the front right-hand side of the vehicle 102, a bistatic condition exists. The emitted radiation is transmitted in the DOD 124-2, and the corresponding radar returns are reflected from the objects 110, ultimately in the DOA 126-1. However, before the radar returns reach the radar system 104, they are interrupted by the barrier 130. Shown is the radar returns traveling in an intermediate direction 128-1 towards the barrier 130. Upon reaching the barrier 130, the radar returns are reflected in the DOA 126-2 back towards the bistatic detector 122. The bistatic detector may determine that the DOA 124-2 and the DOA 126-2 are not equal, and therefore, a bistatic condition exists off to the front right-hand side of the vehicle 102. The bistatic detector 122 can set a flag indicative of the bistatic condition and discard or ignore the radar returns obtained from the DOA 126-2 because they cannot be trusted to localize the vehicle 102 to the one or more objects 110.

Turning to another of the conditions 132, where another bistatic condition exists off to the front left-hand side of the vehicle 102. The emitted radiation is transmitted in the DOD 124-3, and the corresponding radar returns are reflected from the objects 110, ultimately in the DOA 126-3. However, before the radiation reaches the objects 110, it is interrupted by the barrier 130 and takes an intermediate direction 128-2 to get to the objects 110. Likewise, the radar returns that reflect off the objects 110 take another intermediate direction 128-3 back towards the barrier 130, before reaching the radar system 104 in the DOD 126-3. The bistatic detector may determine that the DOA 124-3 and the DOA 126-3 are not equal, or even if equal, energy differences between them indicate a bistatic condition exists off to the front-left-hand side of the vehicle 102. The bistatic detector 122 can set a flag indicative of the bistatic condition and discard or ignore the radar returns obtained from the DOA 126-3 because they cannot be trusted for localizing on the roadway 106.

Lastly, a third bistatic condition occurs off to the rear right-hand side of the vehicle 102. In this case, the emitted radiation is transmitted in the DOD 124-4, and the corresponding radar returns are reflected from the barrier 130, ultimately in the DOA 126-4. However, before the radar returns reach the radar system 104, they are interrupted by the objects 110. The radar returns are shown traveling in an intermediate direction 128-4 towards the objects 110. Upon reaching the objects 110, the radar returns are finally reflected in the DOA 126-4 back towards the bistatic detector 122. The bistatic detector may determine that the DOA 124-4 and the DOA 126-4 are not equal, and therefore, a bistatic condition exists off to the rear right-hand side of the vehicle 102. The bistatic detector 122 can set a flag indicative of the bistatic condition and discard or ignore the radar returns obtained from the DOA 126-4 because they cannot be trusted to localize the vehicle 102 to the one or more objects 110.

Figures 1, 2, 3:
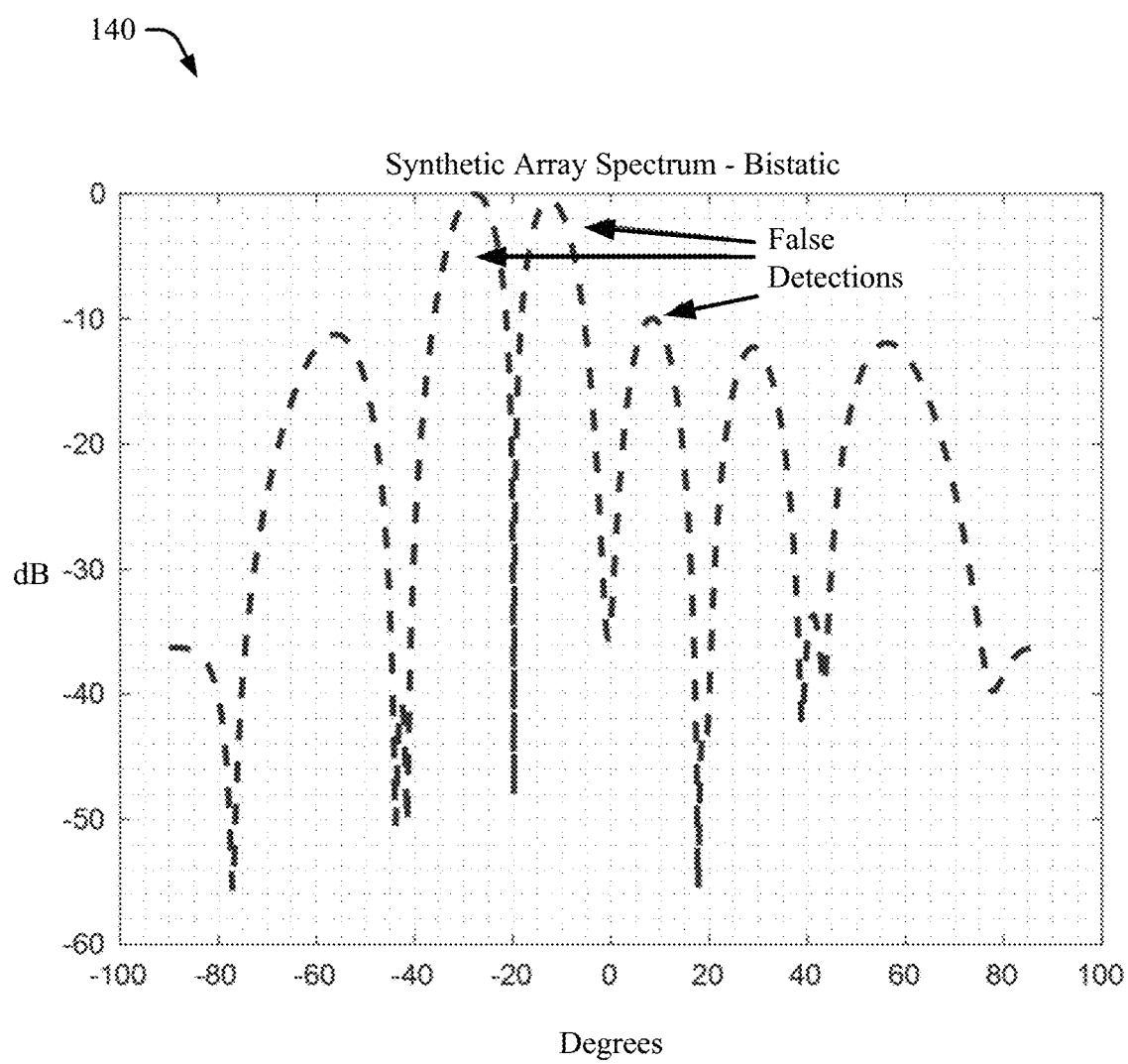
Figure 2:
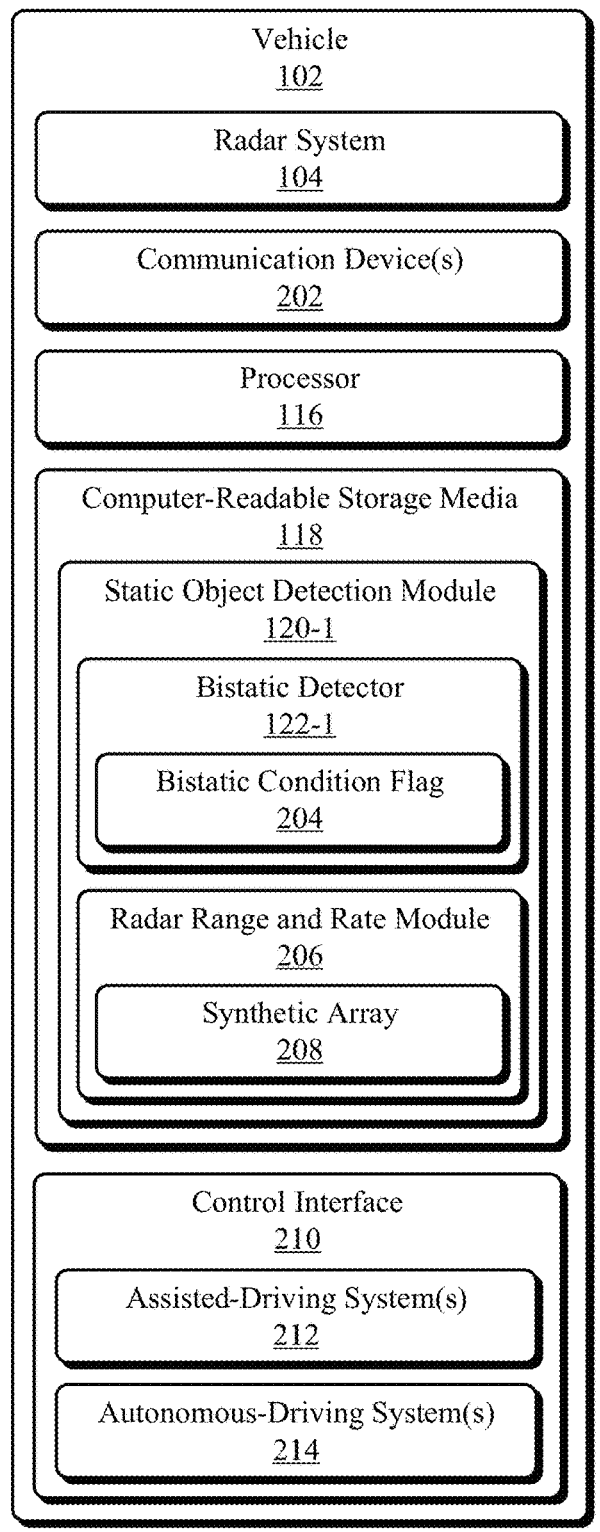
Figures 1, 3:
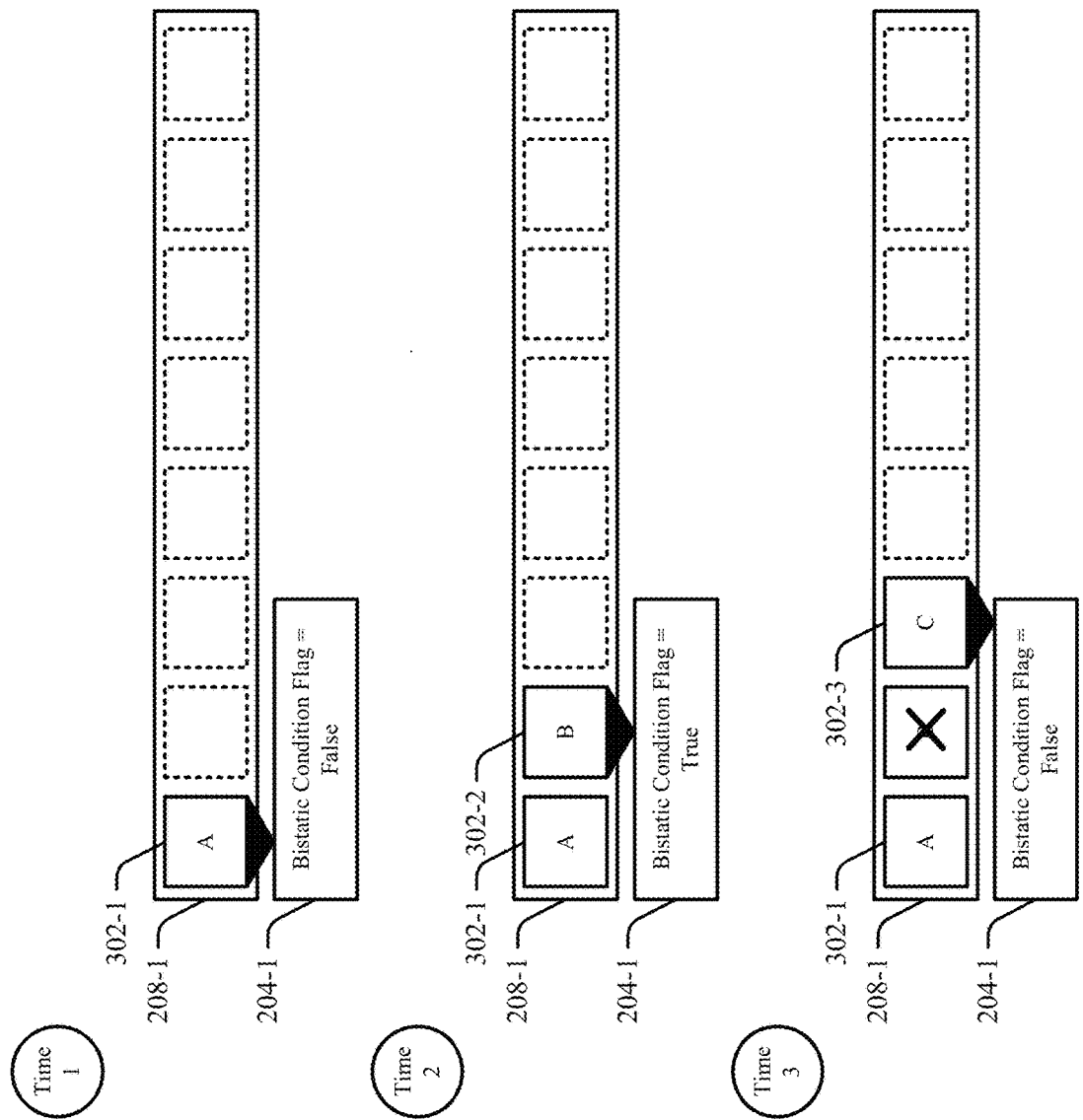
Figures 2, 3:
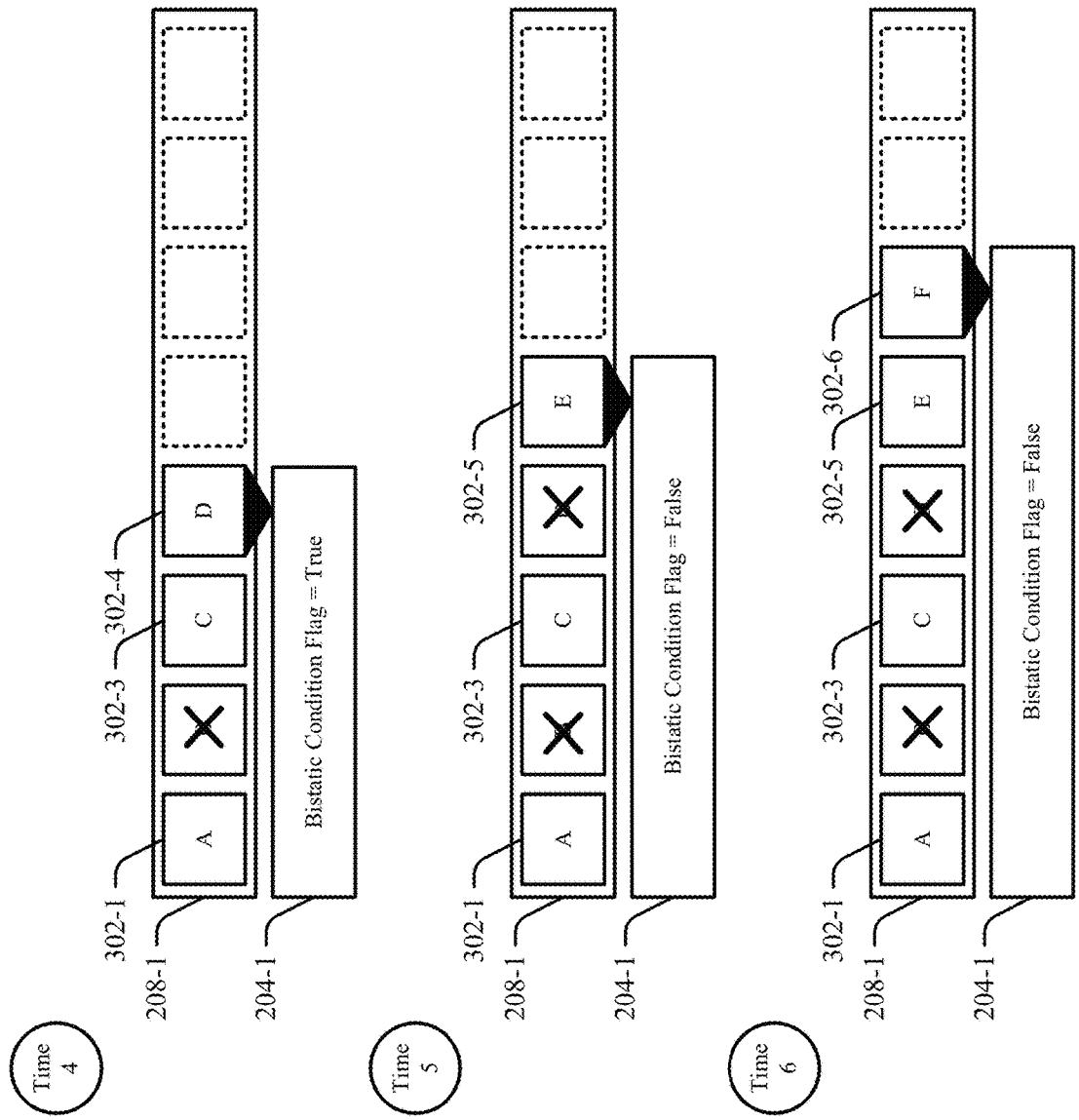

FIG. 1-3 illustrates a fast Fourier transform (FFT) spectrum 140 of an invalid synthetic array formed under bistatic conditions. For example, the FFT spectrum 140 may correspond to the multi-static conditions shown in FIG. 1-2. In FIG. 1-3, the FFT spectrum 140 depicts the ground truth to have a DOD of about negative twenty degrees and a DOA of approximately thirty degrees, but the spectrum is distorted with peaks also forming elsewhere, even a null at negative twenty degrees, making range and feature observations difficult. Eliminating radar returns collected during multi-static conditions, including bistatic conditions, prevents distortions in FFT spectrums of ULAs generated and managed by the radar system 104 and the static object detection module 120.

By filtering the radar detections this way, to remove those obtained under multi-static conditions, the bistatic detector 122 may enable the static object detection module 120 to operate more efficiently when it comes to using the processor 116 and/or storage capacity of the CRM 118. This causes the static object detection module 120 to avoid saturating the computing resources of the vehicle 102, which may enable the radar system 104 to quickly identify and discard from the field-of-view 108, radar detections that are likely to contribute to errors if used for object-classification or control of the vehicle 102. By ignoring and in some cases even discarding unusable radar returns that are likely a result of bistatic conditions, the radar system 104 can focus on processing radar returns from static conditions, for example, in providing radar-based detections as output to an automotive system or controller that is driving the vehicle 102 in an autonomous or a semi-autonomous mode. Through the bistatic detector 122, the radar system 104 provides a highly accurate estimate of bistatic conditions that is sufficiently quick to be used by vehicle-safety systems as well as autonomous and semi-autonomous controls.

Vehicle Configuration

FIG. 2 illustrates an example configuration of a vehicle with a radar system that uses linear prediction-based bistatic detections. As described with respect to FIG. 1, the vehicle 102 can include the radar system 104, the processor 116, the CRM 118, a static object detection module 120-1, which is an example of the static object detection module 120, including a bistatic detector 122-1, which is an example of the bistatic detector 122. In addition, a radar range and rate module 206, which manages a synthetic array 208, forms part of the static object detection module 120-1. The vehicle 102 can also include one or more communication devices 202 and a control interface 210 to one or more vehicle-based systems.

The communication devices 202 can include a sensor interface and a vehicle-based system interface. The sensor interface and the vehicle-based system interface can transmit data (e.g., radar data, range computations, other features mapped to the objects 110 in the field-of-view 108) over a communication bus of the vehicle 102, for example, when the individual components of the static object detection module 120 are integrated within the vehicle 102.

The vehicle 102 also includes the control interface 210 to one or more vehicle-based systems, which individually or in combination provide a way for receiving radar data to control the vehicle 102. Some examples of vehicle-based systems to which the control interface 210 supplies radar data include an assisted-driving system 212 and an autonomous-driving system 214; each may rely on information output from the static object detection module 120-1. For example, they may rely on data, which is communicated via the communication devices 202 and obtained from the radar system 104, to drive the vehicle 102 (e.g., braking, lane changing). Generally, the control interface 210 can use data provided by the static object detection module 120-1 to control operations of the vehicle 102 and perform certain functions not requiring control but also for outputting warnings to passengers, pedestrians, and other vehicles. For example, the assisted-driving system 212 can alert a driver of the one or more objects 110 and perform evasive maneuvers to avoid a collision with the object 110. As another example, the autonomous-driving system 214 can navigate the vehicle 102 to a particular position in the roadway 106 to avoid a collision with the one or more objects 110.

The radar range and rate module 206 receives radar data as input and then outputs processed radar data, which can include a range, a velocity, a range rate, and classification of the objects 110. An input-processing function of the radar range and rate module 206 may maintain a feature-extraction function, as well as a post-processing or output function. The input-processing function enables the radar range and rate module 206 to receive radar data from the transmitter/receiver 112 and the antenna 114 as an input to build the synthetic array 208.

Generally, the radar data is received as low-level, time-series data obtained from a MIMO antenna array of M elements to generate the synthetic array 208, which maps K radar returns (e.g., narrowband signals) to input and output channels of the synthetic array 208. Using low-level, time-series data enables the static object detection module 120 to provide better detection resolution with the radar range and rate module 206 to extract features associated with the one or more objects 110 that appear in the field-of-view 108. Being a ULA, the synthetic array 208 is formed using MIMO techniques to map the K narrowband signals obtained at the M elements to the input and output channels of the synthetic array 208 (where K is less than M) by impinging on the synthetic array 208-1 from distinct directions in the field-of-view 108 (e.g., in the far field).

The input-processing function of the radar range and rate module 206 can process the radar data maintained in the synthetic array 208 to generate interpolated range-angle maps, including interpolated range-azimuth maps and/or interpolated range-elevation maps. The interpolated range-azimuth format improves the accuracy of the static object detection module 120-1 by simplifying the labeling of static objects 110, e.g., for use by a machine-learned model that is configured to make further estimations or predictions from the radar data received as input.

The bistatic detector 122-1 includes a bistatic condition flag 204. The bistatic detector 122 may be configured to set, in the CRM 118, the bistatic condition flag 204, which represents a parameter indicative of whether a bistatic condition occurred, and based on that parameter, determine whether to discard the radar data saved in the synthetic array 208 during that time. For example, if the bistatic condition flag 204 indicates that a bistatic condition likely exists, the bistatic detector 122 may remove, or cause the radar range and rate module 206 to remove, from the synthetic array 208, any inaccurate radar data obtained during that time. Conversely, the bistatic detector 122 may be configured to refrain from discarding the radar returns captured in the synthetic array 208 in response to setting the bistatic condition flag 204 to indicate that a bistatic condition did not occur.

The bistatic detector 122 may reuse the bistatic condition flag 204 to indicate whether subsequent radar returns are received during a bistatic condition. The bistatic detector 122 may be configured to set, in the CRM 118, another parameter or bistatic condition flag to indicate a state of another linear prediction. This way, the bistatic detector 122 may preserve the bistatic condition across multiple frames or time periods. A reappearing bistatic condition may be verification of an earlier linear prediction to introduce further accuracy of each linear prediction. The bistatic detector 122 may be configured to discard the radar returns in response to setting the bistatic condition flag 204 or any other parameter indicative of further linear predictions.

To discard unusable radar returns obtained during a bistatic condition, the bistatic detector 122 and/or the radar range and rate module 206 may clear (e.g., erase, delete, null, void) all of or a portion of the synthetic array 208 that includes the unusable radar returns. The synthetic array 208 or portion thereof may be cleared such that the unusable radar returns are no longer accessible from the CRM 118. In other examples, rather than actively erasing portions of the synthetic array 208 that could be used by other systems that can utilize radar returns obtained under bistatic conditions, the bistatic detector 122 and/or the radar range and rate module 206 may ignore, rather than erase, the unusable radar returns when performing radar range and range-rate calculations.

The bistatic detector 122-1 is configured to closely manage the synthetic array 208 to uncover anomalies that occur under bistatic conditions. This bistatic-detection function enables the radar system 104 to process radar data quickly and efficiently for accurately localizing the vehicle 102 in and around the one or more objects 110 as the vehicle travels on the roadway 106. In this way, the radar system 104, through the linear prediction of bistatic conditions, may enable the control interface 210 to safely operate the vehicle 102 in an autonomous or semi-autonomous mode.

Linear Prediction Theory

FIGS. 3-1 and 3-2 illustrate example conceptual diagrams of a portion of a synthetic array 208-1 accessed by a radar system that uses linear prediction-based bistatic detections. The FIGS. 3-1 to 3-2 show, at different times Time 1, Time 2, Time 3, Time 4, Time 5, and Time 6, a snapshot of the synthetic array 208-1, which is an example of the synthetic array 208 from FIG. 2. Also shown is a state (e.g., True or False) of a bistatic condition flag 204-1, which is an example of the bistatic condition flag 204, and how the state of the bistatic condition flag 204-1 changes during the times Time 1, Time 2, Time 3, Time 4, Time 5, and Time 6. Several bistatic detection approaches based on linear prediction theory are now described in greater detail.

As previously stated, the synthetic array 208-1 is a ULA formed using MIMO techniques to map K narrowband signals received at M antenna elements (where K is less than M) to input and output channels of the synthetic array 208. The K radar returns are mapped to the synthetic array 208-1 by impinging on the synthetic array 208-1 from distinct directions in the field-of-view 108 (e.g., in the far field).

This impinging leads to observations of the M elements, sampled at time t, which can be denoted as $x_1(t)$, $x_2(t)$, ..., $x_M(t)$, respectively. According to the linear prediction theory, a unique set of P complex coefficients $\{c_1, c_2, \ldots, c_P\}$ exist, where K is less than or equal to P and P is less than M, such that Equation 1 is satisfied, where m equals P+1, P+2, ..., M:

$$x_m(t) = \sum_{i=1}^{P} c_i x_{m-i}(i) \qquad \text{Equation 1}$$

Without loss of generality, by ignoring the time stamp, Equation 1 can be written as the following system of linear Equations 2:

$$g - Fc = 0 \qquad \text{Equation 2}$$

In Equation 2, the variables are defined in Equations 3, 4, and 5:

$$g = \begin{bmatrix} x_{P+1} \\ x_{P+2} \\ \vdots \\ x_M \end{bmatrix} \qquad \text{Equation 3}$$

$$F = \begin{bmatrix} x_P & x_{P-1} & \cdots & x_1 \\ x_{P+1} & x_P & \cdots & x_2 \\ \vdots & \vdots & \ddots & \vdots \\ x_{M-1} & x_{M-2} & \cdots & x_{M-P} \end{bmatrix} \qquad \text{Equation 4}$$

$$c = \begin{bmatrix} c_1 \\ c_2 \\ \vdots \\ c_P \end{bmatrix} \qquad \text{Equation 5}$$

In practice, an observable noise may always be present, and therefore, Equation 1 can be rewritten to account for this noise $\delta$ (where the noise $\delta$ is close to the zero vector) as shown in Equation 6.

$$g - Fc = \delta \qquad \text{Equation 6}$$

Next, a coefficient vector c can be obtained by using a least squares function as defined by Equations 7 and 8:

$$\min_{c} \|g - Fc\|_2^2 \qquad \text{Equation 7}$$

$$\hat{c} = (F^H F)^{-1} F^H g \qquad \text{Equation 8}$$

Equation 8 can be utilized to form a polynomial, from which roots of the polynomial can be computed, and finally, an estimate of the directions of the source signals K. Using a total least square function is another option to estimate c. Total least square will provide more accuracy compared to traditional least square, but it also increases computational complexity. Although the following discussion is based on the least square estimate, equivalent results can be derived using the total least square estimate. When least square is used, diagonal loading techniques can handle even cases with ill-conditioned $F^H F$ from Equation 8.

Binary Hypothesis Testing

To detect whether a bistatic reflection happened, the bistatic detector 122 may be configured to utilize binary hypothesis testing, to predict whether $H_0$ occurred and whether $H_1$ occurred, which can be represented as Equation 9:

$$H = \begin{cases} H_0: \text{bistatic did not happen} \\ H_0: \text{bistatic happened} \end{cases} \qquad \text{Equation 9}$$

Based on the previous discussion on MIMO technology, particularly in automotive radar applications, this binary hypothesis H testing can be rewritten as H', as shown in Equation 10:

$$H' = \begin{cases} H_0: DOD = DOA \\ H_1: DOD \neq DOA \end{cases} \qquad \text{Equation 10}$$

In real-world driving conditions, it can be difficult to obtain radar returns with a DOD that is exactly equal to a corresponding DOA. Therefore, a small tolerance $\epsilon$ can be used to configure the bistatic detector 122 to make testing of the binary hypothesis H' feasible. This is represented in Equation 11 as H":

$$H'' = \begin{cases} H_0: |DOD = DOA| \leq \epsilon \\ H_1: |DOD = DOA| > \epsilon \end{cases} \qquad \text{Equation 11}$$

For example, the synthetic array 208 generated for the radar system 104 can include a MIMO subarray configuration. The radar system 104 may include one MIMO subarray having six receive elements at a $0.5\lambda$ spacing and include another MIMO subarray that includes three transmit elements at a $3.0\lambda$ spacing.

In this example, the synthetic array 208 that is generated by the static object detection module 120 and/or the radar range and rate module 206 may be a twelve-channel ULA with $0.5\lambda$ spacing when no bistatic condition $H_0$ happened.

According to the linear prediction theory outline above, and by letting M equal twelve and setting P to three, the bistatic detector 122 may solve the following:

$$e = \min_c \|g - Fc\|_2^2 = \|P_F^\perp g\|_2^2 \approx 0 \qquad \text{Equation 12}$$

In equation 12, $P_F^\perp$ equals $I-P_F$, which equals= $1-F(F^H F)^{-1}F^H$.

On the other hand, when a bistatic condition $H_1$ happens, the portion of the synthetic array 208 containing the radar returns obtained during that condition are not valid; therefore, the synthetic array 208 is not functioning as a ULA. By letting M equal twelve and setting P to three, the error e under $H_1$ will not be close to zero. Thus, the bistatic detection problem can be formed as H''', as represented in Equation 13:

$$H''' = \begin{cases} H_0: \|P_F^\perp g\|_2^2 \leq \rho \\ H_1: \|P_F^\perp g\|_2^2 > \rho \end{cases} \qquad \text{Equation 13}$$

Generalizing the bistatic detector 122, can configure it to operate correctly under a wide range of applications and environmental conditions. The bistatic detector 122 may be configured as a mean-squared-error (MSE) detector that follows Equation 14:

$$\gamma = \frac{\|P_F^\perp g\|_2^2}{M-P} \underset{H_0}{\overset{H_1}{\gtrless}} \rho \qquad \text{Equation 14}$$

When the observation noise power is known, setting ρ as the noise power is an intuitive choice. Training data can be used to find the threshold ρ as well. Specifically, a large amount of non-bistatic data can be simulated and fed into an input of the bistatic detector 122 to generate the $H_0$ statistics based on which the threshold ρ can be derived. This may allow the static object detection module 120 to achieve a particular false alarm rate. Optionally, real road data can be collected and tested as input to the bistatic detector 122 to further refine the threshold ρ. The coefficient size P should be greater than or equal to K; K is the number of sources. When K is known a priori, a typical value for P is equal to K. Otherwise, P can be set such that it is greater than the number of sources K in most cases while ensuring that the coefficients provide a unique solution.

In the example scenario shown in FIGS. 3-1 and 3-2, the bistatic detector 122-1 may process radar returns according to the detector logic γ, from Equation 14. At each one of the different time intervals Time 1, Time 2, Time 3, Time 4, Time 5, and Time 6, the bistatic condition flag 204-1 is one of two values, e.g., true, false, zero, one. When the bistatic condition flag 204-1 is true, the bistatic detector 122-1 has determined that radar returns within at least a portion of the synthetic array 208-1 are invalid because of a bistatic condition. The bistatic condition flag 204-1 may otherwise be false; bistatic conditions may occur less often than static conditions as the vehicle 102 does not always encounter bistatic conditions. In the event of a bistatic condition, however, the bistatic detector 122-1 causes the bistatic condition flag 204-1 to change from a false state to a true state, which invalidates the synthetic array 208-1, or which invalidates the portion of the synthetic array 208-1 that contains the suspect radar data.

At Time 1, radar returns 302-1 are obtained using the radar system 104. The radar range and rate module 206 can create the synthetic array 208-1 upon receipt of the radar returns 302-1. The bistatic detector 122-1 may access the synthetic array 208-1 to determine a linear prediction as to whether a bistatic condition exists with the objects 110 in the environment 100.

The bistatic detector 122-1 may evaluate γ from Equation 14 to determine whether $H_0$ (static condition) or $H_1$ (bistatic condition) satisfies the threshold ρ. Based on whether the radar returns 302-1 are received under a static condition or a bistatic condition, the bistatic detector 122-1 sets the bistatic condition flag 204-1 to false or true, respectively. In the example shown in FIG. 3-1, the bistatic detector 122-1 sets the bistatic condition flag 204-1 to false in response to determining from γ, that a bistatic condition does not exist with the one or more objects 110 in the environment 100. To do this, the bistatic detector 122-1 executes logic that causes it to actively refrain from discarding the radar returns 302-1 and/or the synthetic array 208-1, while outputting to the radar returns 302-1 and/or the synthetic array 208-1 to the control interface 210 for localizing or maneuvering the vehicle 102.

At Time 2, radar returns 302-2 are obtained using the radar system 104. To determine a linear prediction as to whether a bistatic condition exists with the objects 110 in the environment 100 during Time 2, the bistatic detector 122-1 may again access the synthetic array 208-1. The bistatic detector 122-1 may reevaluate γ from Equation 14 to determine whether $H_0$ (static condition) or $H_1$ (bistatic condition) satisfies the threshold ρ. Based on whether the radar returns 302-2 are received under a static condition or a bistatic condition, the bistatic detector 122-1 sets the bistatic condition flag 204-1 to false or true, respectively. In the example shown in FIG. 3-1, the bistatic detector 122-1 sets the bistatic condition flag 204-1 to true in response to determining from γ, that a bistatic condition does likely exist with the one or more objects 110 in the environment 100. The bistatic detector 122-1 executes logic that causes it to actively discard the radar returns 302-2 and/or the synthetic array 208-1 and prevent them from being used by the control interface 210 for vehicle control.

Time 3 is a repeat of Time 1; however, radar returns 302-3 are received and stored in the synthetic array 208-1. The radar returns 302-3 are determined to not have occurred during a bistatic condition, and the bistatic condition flag 204-1 is set back to false.

Conversely to Time 3, at Time 4, radar returns 302-4 are received and stored in the synthetic array 208-1. The radar returns 302-4 are determined to have occurred during a bistatic condition, and the bistatic condition flag 204-1 is set back to true to prevent their eventual use by the static object detection module 120-1 and/or the control interface 210.

Next, Times 5 and 6 are both instances when the bistatic detector 122-1 determines that no bistatic condition exists. Radar returns 302-5 and 302-6 are determined to not have occurred during a bistatic condition, and the bistatic condition flag 204-1 is set back to false to enable their eventual use by the static object detection module 210-1 and/or the control interface 210.

Variations of Hypothesis Testing

The following are further variations on the MSE detector $\gamma$ described with reference to Equation 14.

In a first variation $\gamma'$, consider that throughout the statistics calculation performed by the bistatic detector 122, M and P may remain constant. Thus, Equation 15 can be derived as:

$$\|P_F^\perp g\|_2^2 \underset{H_0}{\overset{H_1}{\gtrless}} \rho(M-P) \qquad \text{Equation 15}$$

Therefore, the bistatic detector 122 may follow a first variation on Equation 14, referenced as statistic gamma $\gamma'$, which equals $\|P_F^\perp g\|_2$, and the threshold $\rho'$ equals $\sqrt{\rho(M-P)}$.

Next, through some standard math operations, Equation 15 can break up into Equations 16 and 18 to produce another variation gamma $\gamma''$ of the above binary hypothesis testing.

$$\|P_F^\perp g\|_2^2 = g^H(P_F^\perp)^H P_F^\perp g = \qquad \text{Equation 16}$$
$$g^H P_F^\perp g = g^H g - g^H F(F^H F)^{-1} F^H g = \|g\|_2^2 - \|P_F g\|_2^2,$$

$$\frac{\|P_F g\|_2^2}{\|g\|_2^2} \underset{H_0}{\overset{H_1}{\gtrless}} 1 - \frac{\rho(M-P)}{\|g\|_2^2} \qquad \text{Equation 17}$$

As mentioned previously, the threshold $\rho$ is equal to noise power, measured asymptotically. Therefore, when the sample length is long enough or a signal-to-noise ratio (SNR) is high enough, Equation 18 can be derived:

$$\frac{\|P_F g\|_2}{\|g\|_2} \underset{H_0}{\overset{H_1}{\gtrless}} \sqrt{\frac{SNR}{SNR+1}} \qquad \text{Equation 18}$$

The detector statistic gamma $\gamma''$ equals $$\frac{\|P_F g\|_2}{\|g\|_2}$$

and the threshold $\rho''$ equals $$\sqrt{\frac{SNR}{SNR+1}}$$

where the SNR is the SNR of the observations. It can be seen that $\rho''$ is very close to the value one, in high SNR cases.

Another example is an interpolation-based detector. Linear prediction theory without accounting for noise is given by Equation 19:

$$g - \sum_{i=1}^{p} c_i f_i = 0 \qquad \text{Equation 19}$$

In equation 19, $f_i$ is the i-th column of matrix F. After some manipulation, the above linear equation 19 can be written as Equation 20:

$$f_p - Gh = 0 \qquad \text{Equation 20}$$

Equations 21 and 22 that follow are derived from Equation 21 and illustrate an interpolation-based detector $\gamma'''$:

$$G = [g, f_1, f_2, \ldots, f_{p-1}, f_{p+1}, \ldots, f_P] \qquad \text{Equation 21}$$

$$h = \left[\frac{1}{c_p}, -\frac{c_1}{c_p}, -\frac{c_2}{c_p}, \ldots, -\frac{c_{p-1}}{c_p}, -\frac{c_{p+1}}{c_p}, \ldots, -\frac{c_P}{c_p}\right] \qquad \text{Equation 22}$$

In these equations, $\rho$ is greater than or equal to one and less than or equal to P, and $c_p$ is not equal to zero. Because c has a unique solution, h exists uniquely and can be estimated from $f_p$ and G using total least square or least square functions when noise is present. Other variations on these detectors can be derived.

One final variation of the MSE detector $\gamma$ may be useful when a uniform linear array, in fact, exists in a transmitter and receiver subarray. The above-proposed detectors $\gamma$, $\gamma'$, $\gamma''$, and $\gamma'''$ are related to calculating the error $e_{syn}$ as being equal to $\|g - F\hat{c}\|_2^2/_{(M-P)}$ where g and F are observations from the synthetic array 208.

When the transmitter and receiver subarray contain a ULA structure for a binary hypothesis test H"" that can be formed as:

$$H'''' = \begin{cases} H_0: e_{syn} - e_{sub} \le \tau \\ H_1: e_{syn} - e_{sub} > \tau \end{cases} \qquad \text{Equation 23}$$

In the above equation, $e_{sub}$ denotes the error calculated from the transmit and receive subarray's synthetic array 208 characteristics, and from which, Equation 24 is derived.

$$\varphi = e_{syn} - e_{sub} \underset{H_0}{\overset{H_1}{\gtrless}} \tau \qquad \text{Equation 24}$$

Accordingly, another detector $\varphi$ is given by Equation 24, which is equivalent to the detector $\gamma$ from Equation 13, because of Equation 25:

$$\gamma = e_{syn} \underset{H_0}{\overset{H_1}{\gtrless}} e_{sub} + \tau = \rho \qquad \text{Equation 25}$$

The error $e_{sub}$ can be treated as a coarse estimate of noise power, and $\tau$ is an additive adjustment to it. A variant $\varphi'$ of the above detector $\gamma$ can be easily proposed as in Equation 26:

$$\varphi' = \frac{e_{syn}}{e_{sub}} \underset{H_0}{\overset{H_1}{\gtrless}} \tau' \qquad \text{Equation 26}$$

Equation 26 forms a detector that is equivalent to detector $\gamma$ as well, that is, $e_{sub}$ is an estimate of noise power and $\tau'$ is a scaling factor.

Figure 4:
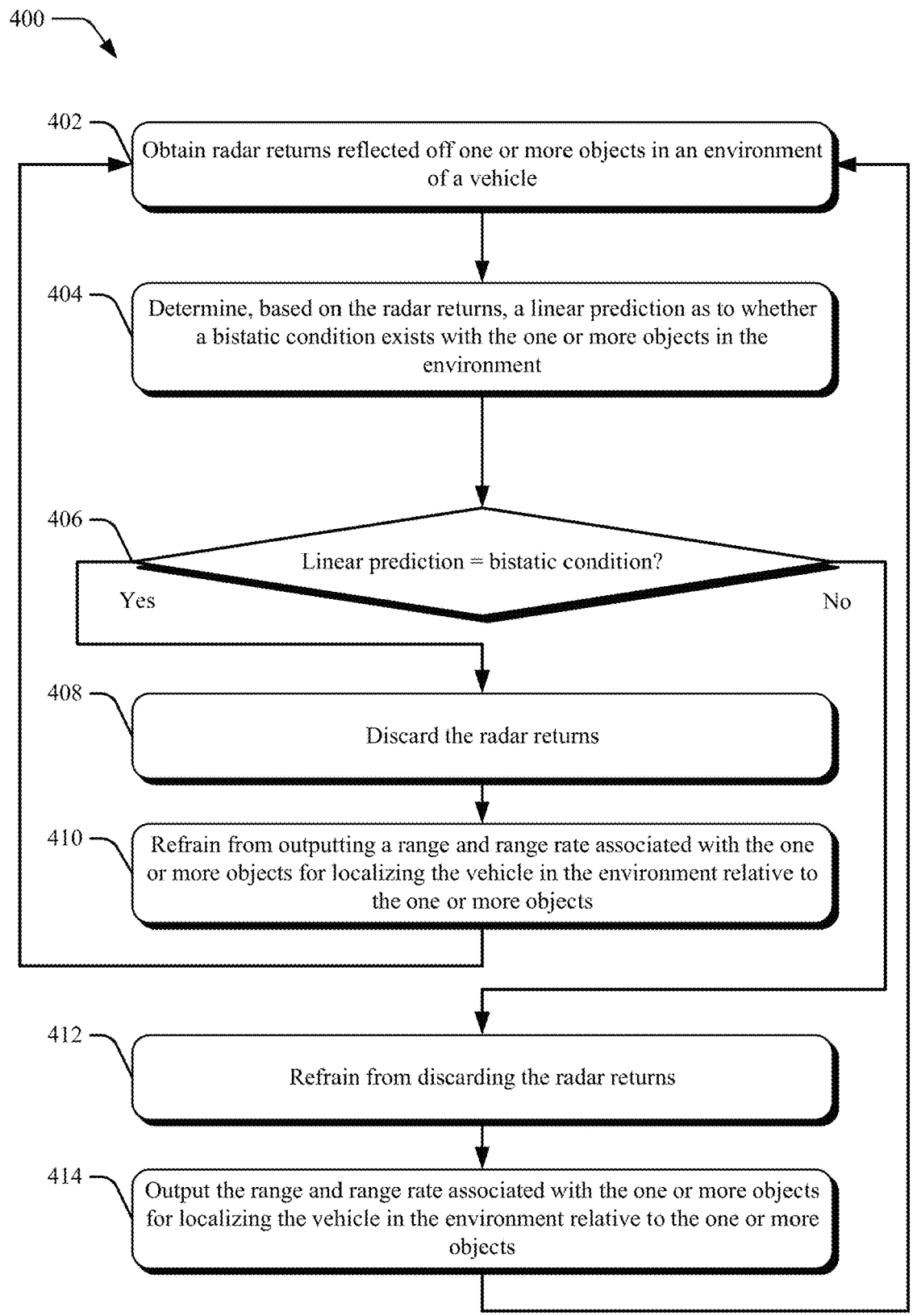
FIG. 4 illustrates a flow diagram of an example method of a radar system that uses linear prediction-based bistatic detections, in accordance with techniques of this disclosure.

FIG. 4 illustrates a flow diagram of an example method 400 of a radar system that uses linear prediction-based bistatic detections, in accordance with techniques of this disclosure. The method 400 is shown as sets of operations (or acts) 402 through 414, which may be performed in, but not necessarily limited to, the order or combinations in which the operations are shown. Further, any of one or more of the operations 402 through 414 may be repeated, combined, or reorganized to provide variations of the method 400. In portions of the following discussion, reference may be made to the environment 100 of FIG. 1 and entities detailed in FIGS. 1-1, 1-2, 1-3, 2, and 3, reference to which is made for example only. The techniques are not limited to performance by one entity or multiple entities.

At 402, radar returns that reflected off one or more objects in an environment of the vehicle are obtained. For example, the radar system 104 receives reflected radiation signals from a position of the one or more objects 110.

At 404, based on the radar returns a linear prediction as to whether a bistatic condition exists with the one or more objects is determined. For example, the radar system 104 determines $\gamma$, $\gamma'$, $\gamma''$, $\gamma'''$, $\varphi$, and/or $\varphi'$.

At 406, based on the linear prediction, whether a bistatic condition exists with the one or more objects in the environment is determined. For example, the radar system 104 evaluates $\gamma$, $\gamma'$, $\gamma''$, $\gamma'''$, $\varphi$, and/or $\varphi'$ to determine whether the radar returns are received under a static condition or a bistatic condition.

At 406 "Yes," responsive to determining that the linear prediction indicate a bistatic condition likely exists with the one or more objects in the environment: at 408, the radar returns are discarded, and at 410, outputting of a range and range rate for localizing the vehicle in the environment is refrained. For example, the radar system 104 discards the synthetic array 208 or portions of the synthetic array 208 to prevent the radar signals obtained under bistatic conditions from being used to interpret relative positions of the one or more objects 110.

Conversely, at 406, "No", responsive to determining that the linear prediction indicates a bistatic condition does not exist with the one or more objects in the environment: at 412, the radar returns are refrained from being discarded, and at 414, a range and range rate to the one or more objects is output to a control interface of the vehicle for localizing the vehicle in the environment relative to the one or more objects. For example, the radar system 104 uses the synthetic array 208 to interpret relative positions of the one or more objects 110 based on a position of the vehicle 102, which are then output to the control interface 210, e.g., to safely maneuver the vehicle 102 in and around the one or more objects 110.

Several bistatic detectors based on linear prediction theory have been proposed, and they are particularly suited for automotive MIMO radar. Detectors that operate in accordance with the described techniques can be used before an angle-finding function of the radar system 104, so as to determine whether there is a large discrepancy between a DOD and a DOA. If the DOD is significantly different from the DOA, functions that execute under an assumption that the synthetic array 208 includes accurate radar data will most likely output incorrect range, range rate, and angle estimates. Conditioning the input to an angle-estimating function on the output of a bistatic detector, such as the bistatic detector 122, may help save computational resources of the radar system 104 and/or trigger other special handling functions designed to better interpret radar data under bistatic cases.

EXAMPLES

In the following section, examples are provided.

Example 1

A method, comprising: obtaining, using a radar system installed on a vehicle, radar returns reflected off one or more objects in an environment of the vehicle; determining, by the radar system, based on the radar returns, a linear prediction as to whether a bistatic condition exists with the one or more objects in the environment; and responsive to determining that the linear prediction indicates a bistatic condition does not exist with the one or more objects in the environment: refraining from discarding the radar returns; and outputting, to a control interface of the vehicle, a range and range rate associated with the one or more objects for localizing the vehicle in the environment relative to the one or more objects.

Example 2

The method of example 1, wherein the radar returns comprise first radar returns reflected off one or more first objects in the environment of the vehicle, the method further comprising: obtaining, using the radar system, second radar returns reflected off one or more second objects in the environment of the vehicle; determining, by the radar system, based on the second radar returns, another linear prediction as to whether a bistatic condition exists with the one or more second objects in the environment; and responsive to determining that the other linear prediction indicates a bistatic condition exists with the one or more second objects in the environment: discarding the second radar returns; and refraining from outputting another range and range rate associated with the one or more second objects to prevent the vehicle from localizing in the environment relative to the one or more second objects.

Example 3

The method of any of the previous examples, wherein further responsive to determining that the other linear prediction indicates a bistatic condition exists in the environment, the method further comprises: immediately obtaining, using the radar system, third radar returns reflected off one or more third objects in the environment of the vehicle; determining, based on the third radar returns, a third linear prediction as to whether a bistatic condition exists with the one or more third objects in the environment; and responsive to determining that the third linear prediction indicates the bistatic condition does not exist with the one or more third objects in the environment: refraining from discarding the third radar returns; and outputting, to the control interface of the vehicle, a third range and range rate associated with the one or more third objects for localizing the vehicle in the environment relative to the one or more third objects and to prevent the vehicle from localizing in the environment relative to the one or more second objects.

Example 4

The method of any of the previous examples, further comprising: setting, in a memory of the radar system, a parameter to indicate the linear prediction; and refraining from discarding the first radar returns in response to setting the parameter to indicate the linear prediction indicates a bistatic condition does not exist with the one or more objects in the environment.

Example 5

The method of any of the previous examples, further comprising: setting, in the memory, another parameter to indicate the other linear prediction; and discarding the second radar returns in response to setting the other parameter to indicate the other linear prediction indicates a bistatic condition exists with the one or more objects in the environment.

Example 6

The method of any of the previous examples, wherein discarding the second radar returns comprises: clearing a portion of a synthetic array comprising the second radar returns.

Example 7

The method of any of the previous examples, wherein clearing a portion of the synthetic array comprises clearing all of the synthetic array.

Example 8

The method of any of the previous examples, wherein discarding the second radar returns comprises: ignoring the second radar returns for radar range and range rate calculations performed by the radar system.

Example 9

The method of any of the previous examples, wherein the one or more objects comprise one or more static objects with a velocity that is less than a movement threshold.

Example 10

The method of any of the previous examples, further comprising: determining the linear prediction as to whether a bistatic condition exists with the one or more objects in the environment based on a detector $\gamma$, wherein: $\gamma$ is equal to $$\frac{\|P_F^\perp g\|_2^2}{M-P} \underset{H_0}{\overset{H_1}{\gtrless}} \rho,$$

$H_0$ is a hypothesis that the bistatic condition did not happen; $H_1$ is a hypothesis that the bistatic condition did happen; the radar returns are sampled at time t and denoted as $x_1(t)$, $x_2(t)$, ..., $x_M(t)$, M is a quantity of elements of a MIMO array of the radar system, P is greater than zero and less than M and comprises a set of complex coefficients $\{c_1, c_2, \ldots, c_P\}$, g equals F multiplied by c; g equals $$\begin{bmatrix} x_{P+1} \\ x_{P+2} \\ \vdots \\ x_M \end{bmatrix},$$

F equals $$\begin{bmatrix} x_P & x_{P-1} & \cdots & x_1 \\ x_{P+1} & x_P & \cdots & x_2 \\ \vdots & \vdots & \ddots & \vdots \\ x_{M-1} & x_{M-2} & \cdots & x_{M-P} \end{bmatrix},$$

and c equals $$\begin{bmatrix} c_1 \\ c_2 \\ \vdots \\ c_P \end{bmatrix}.$$

Example 11

The method of any of the previous examples, further comprising: determining the linear prediction as to whether a bistatic condition exists with the one or more objects in the environment based on a detector $\gamma'$, wherein: $\gamma'$ is equal to $$\|P_F^\perp g\|_2^2 \underset{H_0}{\overset{H_1}{\gtrless}} \rho(M-P).$$

Example 12

The method of any of the previous examples, further comprising: determining the linear prediction as to whether a bistatic condition exists with the one or more objects in the environment based on a detector $\gamma''$, wherein: $\gamma''$ is equal to $$\frac{\|P_F g\|_2}{\|g\|_2} \underset{H_0}{\overset{H_1}{\gtrless}} \sqrt{\frac{SNR}{SNR+1}},$$

and SNR is equal to a signal-to-noise ratio of the radar system.

Example 13

A system, comprising: a radar system for installation on a vehicle, the radar system having at least one processor configured to: obtain radar returns reflected off one or more objects in an environment of the vehicle; determine, based on the radar returns, a linear prediction as to whether a bistatic condition exists with the one or more objects in the environment; and responsive to determining that the linear prediction indicates a bistatic condition does not exist with the one or more objects in the environment: refrain from discarding the radar returns; and output a range and range rate associated with the one or more objects for localizing the vehicle in the environment relative to the one or more objects.

Example 14

The system of example 13, further comprising: an automotive system for controlling the vehicle, the automotive system configured to operate the vehicle in an autonomous or semi-autonomous mode based in part on the range and range rate.

Example 15

The system of example 13, further comprising a vehicle that includes the radar system.

Example 16

The system of example 15, wherein the at least one processor is configured to obtain the radar returns by forming a synthetic array based on multiple-input-multiple-output channels of a phased antenna array.

Example 17

A computer-readable storage medium comprising instructions that, when executed, configure a processor of a radar system to: obtain radar returns reflected off one or more objects in an environment of the vehicle; determine, based on the radar returns, a linear prediction as to whether a bistatic condition exists with the one or more objects in the environment; and responsive to determining that the linear prediction indicates a bistatic condition does not exist with the one or more objects in the environment: refrain from discarding the radar returns; and output a range and range rate associated with the one or more objects for localizing the vehicle in the environment relative to the one or more objects.

Example 18

The computer-readable storage medium of example 17, wherein the radar returns comprise first radar returns reflected off one or more first objects in the environment of the vehicle, the instructions, when executed, further configure the processor to: obtain second radar returns reflected off one or more second objects in the environment of the vehicle; determine, based on the second radar returns, another linear prediction as to whether a bistatic condition exists with the one or more second objects in the environment; and responsive to determining that the other linear prediction indicates a bistatic condition exists with the one or more second objects in the environment: discard the second radar returns; and refrain from outputting another range and range rate associated with the one or more second objects to prevent the vehicle from localizing in the environment relative to the one or more second objects.

Example 19

The computer-readable storage medium of example 18, wherein the instructions, when executed, further configure the processor to: further responsive to determining that the other linear prediction indicates a bistatic condition exists with the one or more objects in the environment: immediately obtain third radar returns reflected off one or more third objects in the environment of the vehicle; determine, based on the third radar returns, a third linear prediction as to whether a bistatic condition exists with the one or more third objects in the environment; and responsive to determining that the third linear prediction indicates a bistatic condition does not exist with the one or more third objects in the environment: refrain from discarding the third radar returns; and output, to a control interface of the vehicle, a third range and range rate associated with the one or more third objects for localizing the vehicle in the environment relative to the one or more third objects and to prevent the vehicle from localizing in the environment relative to the one or more second objects.

Example 20

The computer-readable storage medium of example 18, wherein the instructions, when executed, further configure the processor to: set a parameter to indicate the linear prediction indicates a bistatic condition does not exist with the one or more objects in the environment; and refrain from discarding the first radar returns in response to setting the parameter to indicate the linear prediction indicates a bistatic condition does not exist with the one or more objects in the environment.

Example 21

A system, comprising a radar system for installation on a vehicle, the radar system having at least one processor configured to perform the method of any of the previous examples.

Example 22

A system, comprising a radar system for installation on a vehicle, the radar system comprising means for performing the method of any of the previous examples.

Example 23

A computer-readable storage medium comprising instructions that, when executed by at least one processor of a radar system, cause the at least one processor to perform the method of any of the previous examples.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with bistatic conditions can occur in other systems (e.g., image systems, lidar systems, ultrasonic systems) that identify and process tracks from a variety of sensors. Therefore, although described as a way to improve radar detections of static objects, the techniques of the foregoing description can be applied to other problems to effectively detect bistatic conditions and take appropriate action.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The invention claimed is:

1. A method, comprising:
obtaining, using a radar system installed on a vehicle, radar returns reflected off one or more objects in an environment of the vehicle;
determining, by the radar system, based on the radar returns, a linear prediction as to whether a bistatic condition exists with the one or more objects in the environment from using a detector $\gamma$, wherein:
the detector $\gamma$ is equal to $$\frac{\|P_F^\perp g\|_2^2}{M-P} \underset{H_0}{\overset{H_1}{\gtrless}} \rho,$$

$H_0$ is a hypothesis that the bistatic condition did not happen, $H_1$ is a hypothesis that the bistatic condition did happen, the radar returns are sampled at time t and denoted as $x_1(t)$, $x_2(t), \ldots, x_M(t)$, M is a quantity of elements of a MIMO array of the radar system, P is greater than zero and less than M and comprises a set of complex coefficients $\{c_1, c_2, \ldots, c_p\}$, g equals F multiplied by c, g equals $$\begin{bmatrix} x_{P+1} \\ x_{P+2} \\ \vdots \\ x_M \end{bmatrix},$$

F equals $$\begin{bmatrix} x_P & x_{P-1} & \cdots & x_1 \\ x_{P+1} & x_P & \cdots & x_2 \\ \vdots & \vdots & \ddots & \vdots \\ x_{M-1} & x_{M-2} & \cdots & x_{M-P} \end{bmatrix},$$

and c equals $$\begin{bmatrix} c_1 \\ c_2 \\ \vdots \\ c_P \end{bmatrix};$$

and
  responsive to determining that the linear prediction from using the detector $\gamma$ indicates a bistatic condition does not exist with the one or more objects in the environment:
    refraining from discarding the radar returns; and
    outputting a range and range rate associated with the one or more objects for localizing the vehicle in the environment relative to the one or more objects.

2. The method of claim 1, wherein the radar returns comprise first radar returns reflected off one or more first objects in the environment of the vehicle, the method further comprising:
  obtaining, using the radar system, second radar returns reflected off one or more second objects in the environment of the vehicle;
  determining, by the radar system, based on the second radar returns, another linear prediction as to whether a bistatic condition exists with the one or more second objects in the environment; and
  responsive to determining that the other linear prediction indicates a bistatic condition exists with the one or more second objects in the environment:
    discarding the second radar returns; and
    refraining from outputting another range and range rate associated with the one or more second objects to prevent the vehicle from localizing in the environment relative to the one or more second objects.

3. The method of claim 2, wherein further responsive to determining that the other linear prediction indicates a bistatic condition exists with the one or more objects in the environment, the method further comprises:
  immediately obtaining, using the radar system, third radar returns reflected off one or more third objects in the environment of the vehicle;
  determining, based on the third radar returns, a third linear prediction as to whether a bistatic condition exists with the one or more third objects in the environment; and
  responsive to determining that the third linear prediction indicates a bistatic condition does not exist with the one or more third objects in the environment:
    refraining from discarding the third radar returns; and
    outputting, to a control interface of the vehicle, a third range and range rate associated with the one or more third objects for localizing the vehicle in the environment relative to the one or more third objects and to prevent the vehicle from localizing in the environment relative to the one or more second objects.

4. The method of claim 2, further comprising:
  setting, in a memory of the radar system, a parameter to indicate the linear prediction; and
  refraining from discarding the first radar returns in response to setting the parameter to indicate the linear prediction indicates a bistatic condition does not exist with the one or more objects in the environment.

5. The method of claim 4, further comprising:
  setting, in the memory, another parameter to indicate the other linear prediction; and
  discarding the second radar returns in response to setting the other parameter to indicate the other linear prediction indicates a bistatic condition exists with the one or more objects in the environment.

6. The method of claim 2, wherein discarding the second radar returns comprises:
  clearing a portion of a synthetic array comprising the second radar returns.

7. The method of claim 6, wherein clearing a portion of the synthetic array comprises clearing all of the synthetic array.

8. The method of claim 2, wherein discarding the second radar returns comprises:
  ignoring the second radar returns for radar range and range rate calculations performed by the radar system.

9. The method of claim 1, wherein the one or more objects comprise one or more static objects with a velocity that is less than a movement threshold.

10. The method of claim 1, further comprising:
  determining the linear prediction as to whether a bistatic condition exists with the one or more objects in the environment based on a detector $\gamma'$, wherein:
  $\gamma'$ is equal to $$\|P_F^\perp g\|_2^2 \overset{H_1}{\underset{H_0}{\gtrless}} \rho(M-P).$$

11. The method of claim 10, further comprising:
  determining the linear prediction as to whether a bistatic condition exists with the one or more objects in the environment based on a detector $\gamma''$, wherein:
  $\gamma''$ is equal to $$\frac{\|P_F g\|_2}{\|g\|_2} \overset{H_1}{\underset{H_0}{\gtrless}} \sqrt{\frac{SNR}{SNR+1}},$$

and
  SNR is equal to signal-to-noise ratio of the radar system.

12. A system, comprising:
a radar system for installation on a vehicle, the radar system having at least one processor configured to:
obtain radar returns reflected off one or more objects in an environment of the vehicle;
determine, based on the radar returns, a linear prediction as to whether a bistatic condition exists with the one or more objects in the environment from using a detector $\gamma$, wherein:
the detector $\gamma$ is equal to $$\frac{\|P_F^\perp g\|_2^2}{M-P} \underset{H_0}{\overset{H_1}{\gtrless}} \rho,$$

$H_0$ is a hypothesis that the bistatic condition did not happen, $H_1$ is a hypothesis that the bistatic condition did happen, the radar returns are sampled at time t and denoted as $x_1(t)$, $x_2(t), \ldots, x_M(t)$, M is a quantity of elements of a MIMO array of the radar system, P is greater than zero and less than M and comprises a set of complex coefficients $\{c_1, c_2, \ldots, c_P\}$, g equals F multiplied by c, g equals $$\begin{bmatrix} X_{P+1} \\ X_{P+2} \\ \vdots \\ X_M \end{bmatrix},$$

F equals $$\begin{bmatrix} X_P & X_{P-1} & \cdots & X_1 \\ X_{P+1} & X_P & \cdots & X_2 \\ \vdots & \vdots & \ddots & \vdots \\ X_{M-1} & X_{M-2} & \cdots & X_{M-P} \end{bmatrix},$$

and c equals $$\begin{bmatrix} c_1 \\ c_2 \\ \vdots \\ c_P \end{bmatrix};$$

and
responsive to determining that the linear prediction from using the detector $\gamma$ indicates a bistatic condition does not exist with the one or more objects in the environment:
refrain from discarding the radar returns; and
output a range and range rate associated with the one or more objects for localizing the vehicle in the environment relative to the one or more objects.

13. The system of claim 12, further comprising:
an automotive system for controlling the vehicle, the automotive system configured to operate the vehicle in an autonomous or semi-autonomous mode based in part on the range and range rate.

14. The system of claim 12, further comprising a vehicle that includes the radar system.

15. The system of claim 14, wherein the at least one processor is configured to obtain the radar returns by forming a synthetic array based on multiple-input-multiple-output channels of a phased antenna array.

16. A non-transitory computer-readable storage medium comprising instructions that, when executed, configure a processor of a vehicle to:
obtain radar returns reflected off one or more objects in an environment of the vehicle;
determine, based on the radar returns, a linear prediction as to whether a bistatic condition exists with the one or more objects in the environment from using a detector $\gamma$, wherein:
the detector $\gamma$ is equal to $$\frac{\|P_F^\perp g\|_2^2}{M-P} \underset{H_0}{\overset{H_1}{\gtrless}} \rho,$$

$H_0$ is a hypothesis that the bistatic condition did not happen, $H_1$ is a hypothesis that the bistatic condition did happen, the radar returns are sampled at time t and denoted as $x_1(t)$, $x_2(t), \ldots, x_M(t)$, M is a quantity of elements of a MIMO array of the radar system, P is greater than zero and less than M and comprises a set of complex coefficients $\{c_1, c_2, \ldots, c_P\}$, g equals F multiplied by c, g equals $$\begin{bmatrix} X_{P+1} \\ X_{P+2} \\ \vdots \\ X_M \end{bmatrix},$$

F equals $$\begin{bmatrix} X_P & X_{P-1} & \cdots & X_1 \\ X_{P+1} & X_P & \cdots & X_2 \\ \vdots & \vdots & \ddots & \vdots \\ X_{M-1} & X_{M-2} & \cdots & X_{M-P} \end{bmatrix},$$

and c equals $$\begin{bmatrix} c_1 \\ c_2 \\ \vdots \\ c_P \end{bmatrix};$$

and
responsive to determining that the linear prediction from using the detector $\gamma$ indicates a bistatic condition does not exist with the one or more objects in the environment:
refrain from discarding the radar returns; and
output a range and range rate associated with the one or more objects for localizing the vehicle in the environment relative to the one or more objects.

17. The computer-readable storage medium of claim 16, wherein the radar returns comprise first radar returns reflected off one or more first objects in the environment of the vehicle, the instructions, when executed, further configure the processor to:
obtain second radar returns reflected off one or more second objects in the environment of the vehicle;
determine, based on the second radar returns, another linear prediction as to whether a bistatic condition exists with the one or more second objects in the environment; and responsive to determining that the other linear prediction indicates a bistatic condition exists with the one or more second objects in the environment:
discard the second radar returns; and
refrain from outputting another range and range rate associated with the one or more second objects to prevent the vehicle from localizing in the environment relative to the one or more second objects.

18. The computer-readable storage medium of claim 17, wherein the instructions, when executed, further configure the processor to:
further responsive to determining that the other linear prediction indicates a bistatic condition exists with the one or more objects in the environment:
immediately obtain third radar returns reflected off one or more third objects in the environment of the vehicle;
determine, based on the third radar returns, a third linear prediction as to whether a bistatic condition exists with the one or more third objects in the environment; and
responsive to determining that the third linear prediction indicates a bistatic condition does not exist with the one or more third objects in the environment:
refrain from discarding the third radar returns; and
output, to a control interface of the vehicle, a third range and range rate associated with the one or more third objects for localizing the vehicle in the environment relative to the one or more third objects and to prevent the vehicle from localizing in the environment relative to the one or more second objects.

19. The computer-readable storage medium of claim 17, wherein the instructions, when executed, further configure the processor to:
set a parameter to indicate the linear prediction indicates a bistatic condition does not exist with the one or more objects in the environment; and
refrain from discarding the first radar returns in response to setting the parameter to indicate the linear prediction indicates a bistatic condition does not exist with the one or more objects in the environment.

* * * * *